United States Patent [19]

Ryan

[11] Patent Number: 4,744,459
[45] Date of Patent: May 17, 1988

[54] METHOD AND APPARATUS FOR ACCUMULATING STOCKPILES OF FLOWABLE SOLID MATERIAL

[76] Inventor: Patrick J. Ryan, 64, Ballinclea Heights, Killiney Co., Dublin, Ireland

[21] Appl. No.: 619,688

[22] Filed: Jun. 13, 1984

Related U.S. Application Data

[63] Continuation of Ser. No. 328,863, Dec. 9, 1981, abandoned.

[30] Foreign Application Priority Data

Dec. 18, 1980 [DE] Fed. Rep. of Germany ....... 3047756

[51] Int. Cl.⁴ ................... B65G 21/08; B65G 65/28; B65G 69/04
[52] U.S. Cl. .................. 198/508; 198/364; 198/569; 414/133
[58] Field of Search ........ 198/508, 370, 371, 594–595, 198/569, 601, 585, 364; 414/133, 300

[56] References Cited

U.S. PATENT DOCUMENTS

| | | |
|---|---|---|
| 677,677 | 7/1901 | Messiter .............................. 198/508 |
| 2,780,368 | 2/1957 | Hickey et al. .................. 198/569 X |
| 3,530,973 | 9/1970 | Rossi .................................... 198/594 |
| 4,164,294 | 8/1979 | Johnson .............................. 198/364 |
| 4,179,234 | 12/1979 | Young .................................. 414/133 |
| 4,358,237 | 11/1982 | MacKenzie et al. ................ 414/300 |
| 4,586,599 | 5/1986 | Walters ................................ 198/364 |

FOREIGN PATENT DOCUMENTS

| | | | |
|---|---|---|---|
| 805023 | 7/1949 | Fed. Rep. of Germany ...... 414/300 |
| 1001646 | 1/1957 | Fed. Rep. of Germany ...... 414/133 |
| 202519 | 3/1959 | Fed. Rep. of Germany ...... 198/365 |
| 142342 | 9/1953 | Switzerland ........................ 198/508 |

Primary Examiner—Robert J. Spar
Assistant Examiner—Janice Krizek
Attorney, Agent, or Firm—Peter K. Kontler

[57] ABSTRACT

An elongated stockpile of flowable solid material with two halves disposed at the opposite sides of a longitudinal vertical symmetry plane is accumulated by transporting the material feeding portion of an elongated conveyor in the interior and lengthwise of the upper slope of a mansard-shaped shed together with a manifold having two ducts which receive flowable material from the feeding portion and flank the conveyor. The ducts discharge material onto two discrete transverse conveyors which are shiftable so that their discharge ends move nearer to or further away from the symmetry plane. The transverse conveyors are movable with the manifold lengthwise of the upper slope and are mounted on a gauntry which travels along rails. The transverse conveyors discharge streams of flowable material which forms elongated piles, first on the floor and thereupon on the layer of flowable material which is formed by the piles covering the floor at both sides of the symmetry plane. The transverse conveyors are shifted upon completion of each forward and each return stroke of the gauntry so that successively deposited piles are staggered with reference to previously deposited piles.

6 Claims, 2 Drawing Sheets

METHOD AND APPARATUS FOR ACCUMULATING STOCKPILES OF FLOWABLE SOLID MATERIAL

This application is a continuation, of application Ser. No. 328,863, filed Dec. 9, 1981, now abandoned.

BACKGROUND OF THE INVENTION

The present invention relates to stockpiling of flowable solid materials, such as coal, gravel, wheat, sand or the like, and more particularly to improvements in apparatus for accumulating and thereupon depleting stockpiles or heaps of such materials. Still more particularly, the invention relates to improvements in a method of and an apparatus for accumulating and simultaneously intermixing the ingredients of stockpiles consisting of flowable solid materials and for removing flowable materials from the thus accumulated stockpiles.

It is already known to accumulate flowable solid materials in the form of stockpiles or heaps wherein two halves of the accumulated material are mirror symmetrical to each other with reference to a vertical symmetry plane. Such stockpiles are often accumulated in the interior of a building, such as a shed, silo or hall.

Heretofore known techniques of accumulating stockpiles of coal, coke, grain, gravel, sand or like flowable solid materials include the so-called chevron process and the so-called windrow method. The chevron process can be practiced by resorting to a conveyor belt which extends above the crest and in the longitudinal direction of the stockpile and includes a looped portion serving to discharge flowable material while moving back and forth along an elongated path. The material which accumulates below the conveyor forms several layers which together form a stockpile resembling a gable roof. The ends of the stockpile have a semiconical shape. A drawback of the chevron process is that the stockpile cannot adequately fill a shed so that a relatively high percentage of the interior of the shed remains unoccupied, especially at the ends of the stockpile. Moreover, intermixing of the ingredients of the stockpile is unsatisfactory, especially at each end. Still further, it is difficult to remove material from the stockpile at a uniform or predictable rate, especially at the ends of the accumulated material.

The windrow method can be practiced by resorting to a conveyor which is adjacent to one side of the stockpile and supplies flowable solid material to a boom whose free end discharges thin piles of flowable material in the form of several parallel rows. Such rows form superimposed layers in that they are deposited next to as well as on top of each other. A mirror-symmetrical distribution of rows can be achieved by depositing a first row at one side of the imaginary symmetry plane which extends lengthwise of and halves the stockpile, by thereupon depositing a row at the other side of such plane, by again depositing a row at the one side of the plane, thereupon at the other side of the plane, and so forth. This necessitates changes in the effective length of the boom. The ends of a stockpile which is accumulated in accordance with the windrow method resemble semipyramidal bodies which is advantageous because such bodies are more likely to fill the corresponding ends of a shed or another structure in which the apparatus for accumulating the stockpile is installed. Furthermore, the windrow method ensures more satisfactory intermixing of the constituents at both ends of the stockpile as well as a more satisfactory or more predictable removal of material from the accumulated mass of granular, pulverulent or similarly configurated particles. However, the windrow method also exhibits several serious drawbacks. Thus, the boom requires additional space at one end of the stockpile because it must be fully extended over the accumulated material. Furthermore, the boom must be afforded room for pivotal movement, and the accumulation of a fully grown stockpile takes up a relatively long interval of time.

OBJECTS AND SUMMARY OF THE INVENTION

An object of the invention is to provide a novel and improved method of accumulating stockpiles of flowable granular and/or pulverulent solid material which ensures rapid formation of a stockpile, which ensures that the configuration of the stockpile is best suited to adequately fill the interior of a shed or a like structure customarily employed for confinement of stockpiles, and which ensures a highly satisfactory intermixing of the constituents of the stockpile.

Another object of the invention is to provide a method which renders it possible to accumulate a stockpile of such configuration that the stockpile can be readily depleted in a predictable manner, not only in the central region but also at each of its ends.

A further object of the invention is to provide a stockpiling method which can be resorted to for the accumulation of a succession of identically configurated stockpiles.

An additional object of the invention is to provide a novel and improved apparatus for the practice of the above outlined method.

Another object of the invention is to provide the apparatus with novel and improved means for diverting flowable material from a source of supply to the locations where the material is poured onto the floor of a shed or onto the previously discharged material.

Still another object of the invention is to provide the apparatus with novel and improved means for effecting a highly satisfactory intermixing of larger and smaller, lighter and heavier and/or coarser and finer constituents of the flowable material in the course of the accumulation of a pile.

Another object of the invention is to provide a very simple, compact and inexpensive apparatus which can be installed in existing sheds or like buildings as a superior substitute for heretofore used apparatus which accumulate stockpiles consisting of one or more flowable solid materials.

A further object of the invention is to provide the apparatus with novel and improved means for simultaneously discharging identical quantities of flowable solid material at the opposite sides of the central longitudinal vertical symmetry plane of the growing stockpile.

One feature of the invention resides in the provision of a method of accumulating a stockpile or heap of flowable solid material which may be of pulverulent, granular or similar consistency. The method comprises the steps of forming at least two streams of flowable solid material, preferably simultaneously discharging the leaders of such streams along substantially parallel paths at the opposite sides of a vertical symmetry plane to thereby deposit a pair of elongated piles of flowable material, and changing the distance between the two paths, as considered at right angles to the symmetry plane, preferably upon completed deposition of each pair of piles so that at least some freshly deposited piles at least partially overlap the preceding piles.

The discharging step may comprise depositing a first layer of parallel piles on the ground (e.g., on the floor of a shed), and the distance changing step may include moving the leaders of the two streams with a view to accumulate a second layer of piles which are staggered with reference to the piles of the first layer and additional layers of piles which are staggered with reference to the piles of the layers therebelow so that the fully grown stockpile has a substantially triangular cross-sectional outline.

The method can further comprise the step of depleting the stockpile, and such depleting step preferably includes removing piles or rows of flowable material substantially at right angles to the symmetry plane.

The improved apparatus comprises a source of supply of flowable solid material, means for diverting from the source first and second streams of flowable material (such diverting means has first and second material discharging portions which pour or strew or spray flowable material onto the floor of a shed or a like edifice or onto the previously discharged material), means for moving the diverting means back and forth so that the flowable material leaving the material discharging portions forms two parallel piles, and means for shifting the material discharging portions toward or away from each other substantially transversely of the piles to thereby change the distance between such portions and between the piles of successively poured pairs of piles. The diverting means can comprise a manifold with first and second outlets for flowable material and first and second conveyors which include the respective material discharging portions each of which receives flowable material from the respective outlet. The shifting means includes means for moving the conveyors relative to each other and with reference to the manifold.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
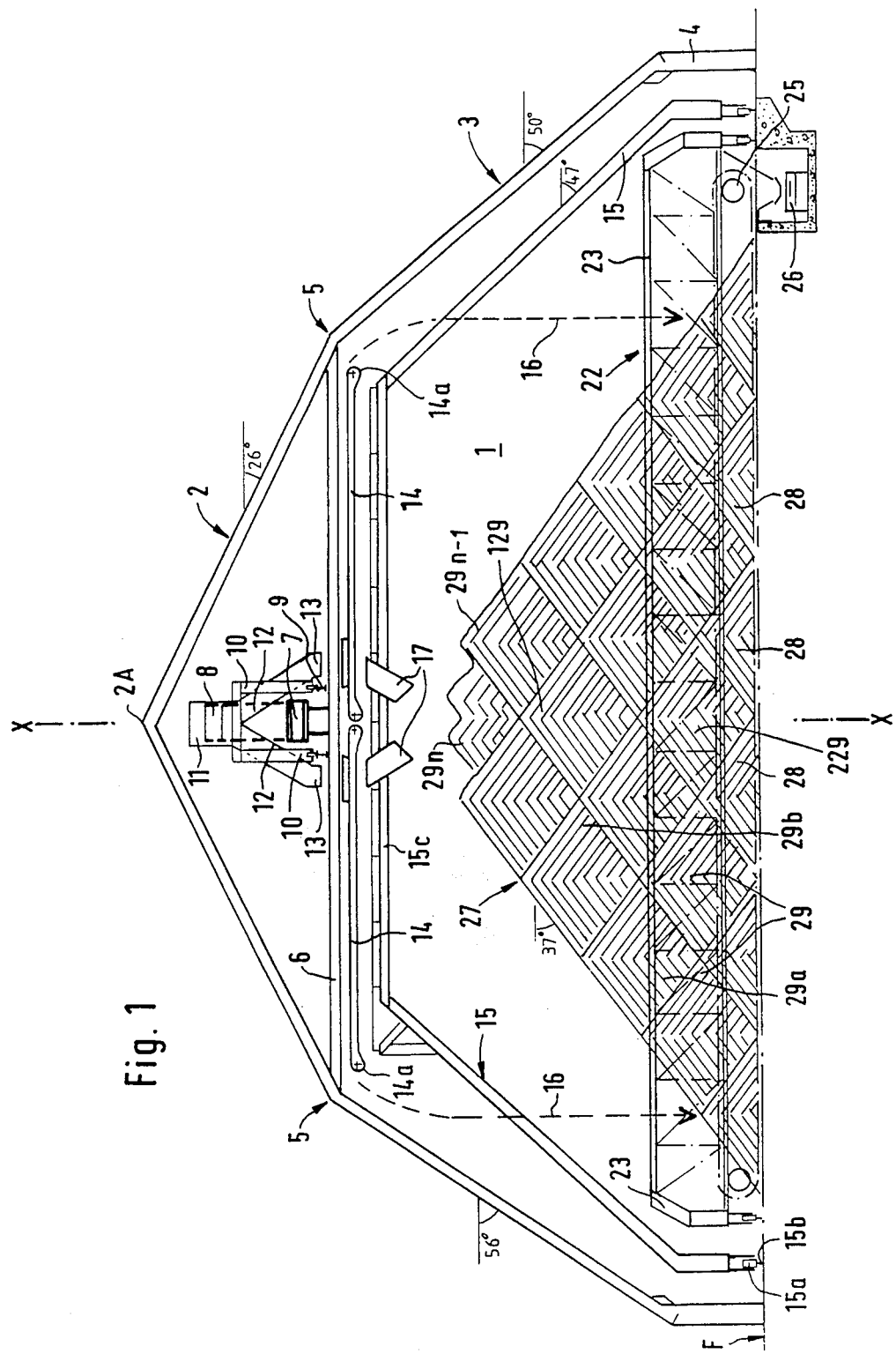
FIG. 1 is a schematic transverse vertical sectional view of a shed for a stockpile of flowable solid material and of an apparatus which can be utilized to accumulate the stockpile.

FIG. 1 shows a shed 1 which resembles a mansard with a substantially flat elongated upper portion or slope 2, a steeper lower portion or slope 3 and a foundation 4 for the slope 3. Horizontal crossheads or carriers 6 connect the two halves of the shed 1 in the regions of junctions 5 between the corresponding sections of the slopes 2 and 3. Additional reinforcing or stiffening elements in the form of upright, horizontal or inclined braces can be provided in the space within the upper slope 2, i.e., at a level above the crossheads 6.

The median portions of the crossheads 6, i.e., those portions which are located below the ridge 2A of the shed 1, carry a source of supply of flowable solid material (such as pulverulent and/or granular coal, slag or the like). The source of supply is an elongated belt conveyor 7 having an upwardly extending looped material feeding portion 8 serving to supply a continuous stream of flowable material into the manifold 11 of a material diverting unit which further includes two endless belt conveyors 14 extending at right angles to the longitudinal direction of the ridge 2A and conveyor 7. The material feeding portion 8 is movable lengthwise of the ridge 2A, i.e., transversely of the crossheads or carriers 6, by a carriage 10 whose wheels can roll along horizontal rails 9 mounted on the crossheads 6. The lower portion of the manifold 11 has two outwardly and downwardly sloping chutes or ducts 12 having outlets 13 disposed at a level above the upper reaches of the respective conveyors 14. The manner in which the flowable material is supplied to the one or the other end of the conveyor 7 and in which one or more pulleys for the conveyor 7 are driven so as to supply flowable material into the manifold 11 is not specifically shown in the drawing. It suffices to say that the material feeding portion 8 of the conveyor 7 supplies a continuous stream of flowable material to the manifold 11 whose ducts 12 discharge two continuous streams of flowable material onto the upper reaches of the conveyors 14 at the opposite sides of the conveyor 7. The discharge ends or material discharging portions 14a of the conveyors 14 allow the leaders of the two streams of flowable material to descend by gravity onto the floor F of the shed 1 or onto the previously discharged flowable material so that the material which has left the conveyors 14 forms a growing heap or stockpile.

Figure 3:
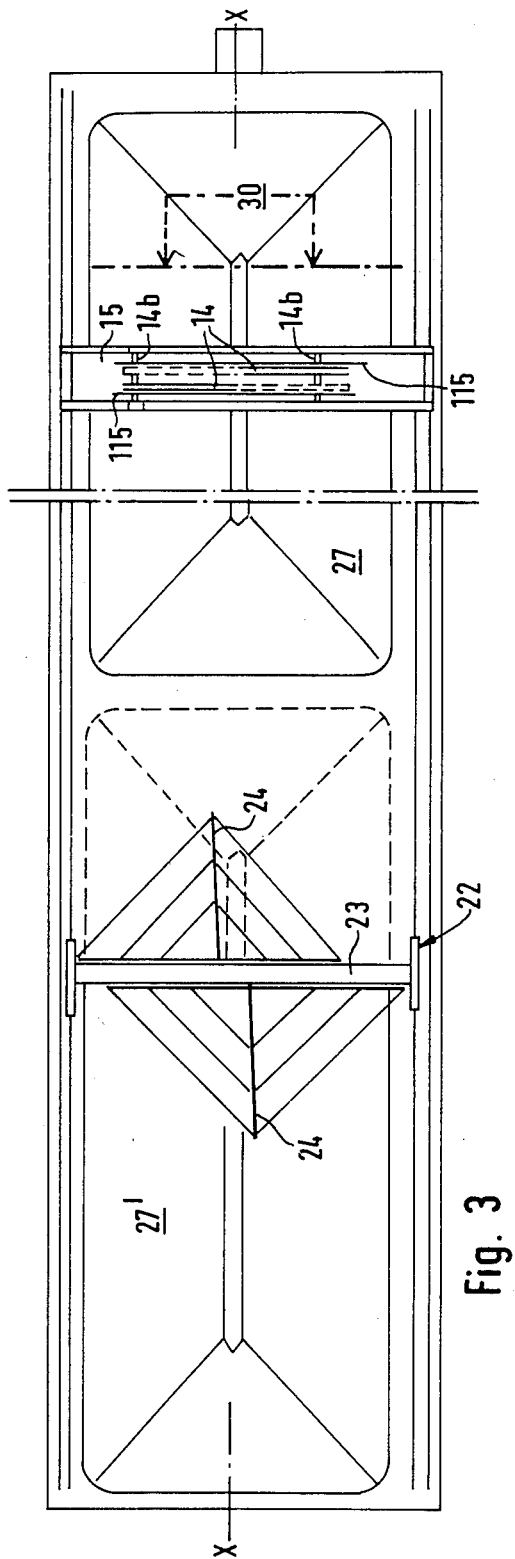
FIG. 3 is a plan view of the structure shown in FIG. 2.

The fully grown stockpile is shown at 27. As can be seen in the right-hand portion of FIG. 3, the end portions 30 of the fully grown stockpile 27 have a substantially semipyramidal configuration which is highly satisfactory because such end portions can properly fill substantial or major parts of the respective ends of the shed 1. FIG. 3 further shows that the shed 1 can accumulate two or more aligned stockpiles including the stockpile 27 and a second stockpile 27' which is in the process of being depleted.

Figure 2:
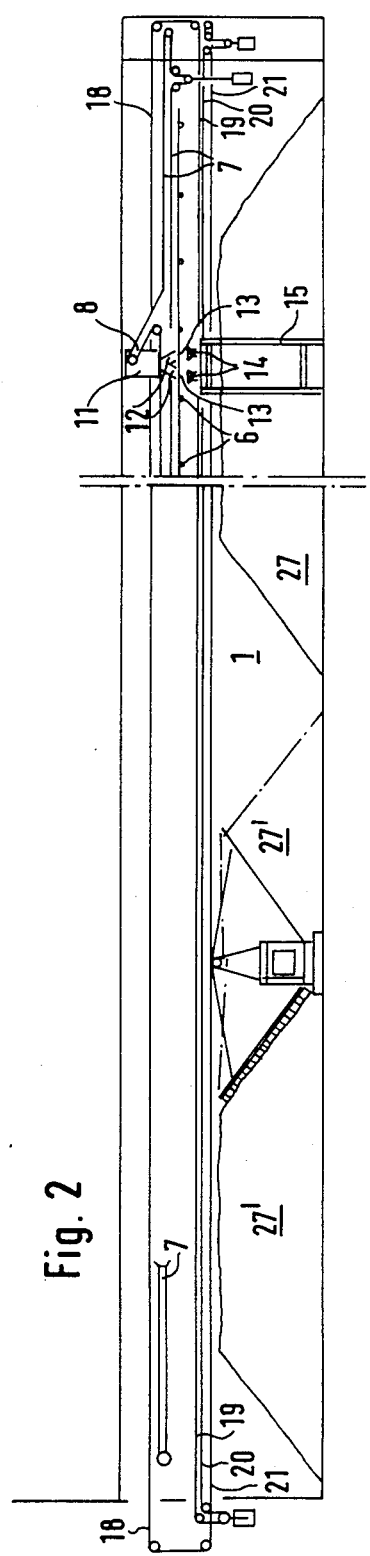
FIG. 2 is a smaller-scale longitudinal vertical sectional view of the structure which is shown in FIG. 1, with the roof of the shed omitted.

FIG. 2 shows that the outlets 13 of the ducts 12 are staggered with reference to each other, as considered in the longitudinal direction of the conveyor 7, and that the two conveyors 14 are also staggered with reference to each other so that the upper reaches of these conveyors are always or nearly always disposed below the respective outlets 13. Moreover, such staggered mounting of the conveyors 14 enables them to move relative to each other to positions of partial or pronounced overlap, i.e., the material discharging portions 14a of the conveyors 14 can move nearer to or further away from each other which is tantamount to a movement toward or away from a central vertical symmetry plane X—X halving the stockpile 27 and intersecting the shed 1 in the region of the ridge 2A.

The conveyors 14 are mounted at a level below the crossheads 6 on a gauntry-like framework 15 which has wheels 15a mounted on horizontal rails 15b supported by the floor F. The means for driving the endless belts of the conveyors 14 so that their upper reaches move outwardly (away from the plane X—X) in order to deliver the respective streams of flowable material to the corresponding portions 14a includes shafts 14b shown in FIG. 3. Furthermore, the conveyors 14 are movable, in their entirety, along the top portion or platform 15c of the gauntry 15 in order to move the material discharging portions 14a nearer to or away from the plane X—X. The means for shifting the conveyors 14 at right angles to the plane X—X comprises tracks 115 (indicated in FIG. 3 by lines) for wheels on the frames which mount the conveyors 14 and suitable motor means or hand-operated means for displacing the wheels of the frames lengthwise of the tracks 115. It suffices to say that the conveyors 14 can be driven to move the flowable material toward the respective discharging portions 14a, and that the conveyors 14 are further shiftable transversely of the plane X—X to move the portions 14a nearer to or further away from each other. FIG. 1 shows, by broken lines, two streams 16 of flowable material which are supplied by the portions 14a of the conveyors 14 and whose contents descend onto the growing stockpile when the endless belts or bands of the conveyors 14 are in motion and the portion 8 of the conveyor 7 is also in motion to deliver flowable material to the manifold 11.

The conveyors 14 are movable apart to such an extent that they allow the material issuing from the outlets 13 of the ducts 12 to descend directly into suitably inclined auxiliary ducts 17 mounted on the central portion of the platform 15c of the gauntry 15 and serving to direct streams of flowable material into the region of the symmetry plane X—X so as to form the crest of the stockpile 27. The auxiliary ducts 17 slope downwardly and inwardly, i.e., toward the symmetry plane X—X, so that the flowable material which issues therefrom can form a single elongated pile 29n when the gauntry 15 is in motion. The motor means for advancing the gauntry 15 toward and away from the observer of FIG. 1 has been omitted for the sake of clarity. Such motor means can comprise a reversible electric motor driving a pinion which meshes with a toothed rack on one of the rails 15b. Other means for moving the gauntry 15 along the rails 15b can be used with equal advantage. The movements of the carriage 10 and gauntry 15 are preferably synchronized so that the material feeding portion 8 of the conveyor 7 invariably moves in the same direction as and at the speed of the gauntry 15. These parts are movable between two predetermined end positions whose mutual spacing determines the length of the stockpile 27. The synchronizing means comprises a system of cables and pulleys. Four stretches of the cables forming part of the synchronizing system are shown in FIG. 2, as at 18, 19, 20 and 21. The stretches 18 and 20 are respectively secured to the carriage 10 and gauntry 15. It will be readily appreciated that the illustrated mechanical synchronizing means can be replaced with a suitable electrically, hydraulically or pneumatically operated synchronizing arrangement without departing from the spirit of the invention.

The means (shown in FIG. 3) for depleting a fully grown stockpile 27' is or can be of conventional design. The illustrated depleting means 22 comprises two scraper booms 24 which are mounted on and movable along or with a bridge 23 extending at right angles to the symmetry plane X—X. The depleting means 22 further comprises a first conveyor 25 which extends lengthwise of the bridge 23 and receives flowable material from the booms 24 to deliver the thus received material to a second or evacuating conveyor 26 (see FIG. 1).

The building or shed 1 can be said to constitute a means for supporting the conveyor 7 as well as portions (11-13) of the diverting means and a portion (10) of the means for moving the diverting means (11-14a) lengthwise of the upper portion or slope 2 of the shed.

The operation is as follows:

The conveyor 7 is set in motion to deliver a continuous stream of flowable material into the manifold 11 whose ducts 12 discharge two continuous streams of such material onto the upper reaches of the conveyors 14. The conveyors 14 are driven so that their material discharging portions 14a receive discrete streams 16 of flowable material which overflows the portions 14a and descends onto the floor F to form two elongated piles extending in parallelism with the symmetry axis X—X because the gauntry 15 and the carriage 10 are driven to advance lengthwise of the plane X—X. The portions 14a supply the two streams 16 into the spaces at the opposite sides of the plane X—X, and the two portions 14a may but need not be equidistant from such plane. When the formation of two parallel piles at the opposite sides of the plane X—X is completed, one of the conveyors 14 or each of the conveyors 14 is shifted transversely of the plane X—X so that their portions 14a are located nearer to or further away from each other. This results in the formation of two additional piles which also come to rest on the floor F. The same procedure is repeated until the piles on the floor F form a first or lowermost layer 28. The formation of this layer is followed by the formation of a second layer 29 whose piles are preferably staggered with reference to the adjacent piles of the layer 28, by the formation of a third layer 29a whose piles are staggered with reference to the piles of the layer 29, by the formation of a fourth layer 29b whose piles are staggered with reference to the piles of the layer 29a, and so forth. The pile 29n is formed by the material which is discharged by the ducts 12 into the respective ducts 17 and is delivered between the piles of the topmost layer 29n−1.

The layers 28 to 29n−1 can be formed by moving the conveyors 14 transversely of the plane X—X so that their portions 14a move apart or toward each other, i.e., each layer can be built in a direction away from or toward the plane X—X. The piles of the lowermost layer 28 have a substantially triangular cross-sectional outline because their undersides come to rest on the horizontal portions of the floor F. The piles of the layers 29 to 29n−1 have a substantially diamond-shaped or rhomboidal cross-sectional outline. The cross-section of the fully grown stockpile 27 resembles an isosceles triangle whose apex is at 29n. The auxiliary ducts 17 can serve to supply the material which forms the pile 29n as well as the centrally located piles (such as 129, 229) therebelow. In other words, the shifting means can move the conveyors 14 sufficiently apart to allow the flowable material to descend from the ducts 12 into the respective ducts 17 upon completed formation of each horizontal layer or upon completed formation of certain layers. At any rate, the ducts 17 render it possible to impart to the stockpile 27 a substantially triangular shape with a high degree of predictability and reproducibility. The width of piles in each of the layers 28, 29, etc. can be readily selected in such a way that the neighboring piles of the layer 28 contact each other and that the piles of each upper layer fill the furrows or grooves between the piles of the layer therebelow. The height of the fully grown stockpile 27 depends on the natural angle of repose or slope of the accumulated flowable material. As mentioned above, the end portions 30 of the fully grown stockpile 27 have a substantially semipyramidal shape which ensures adequate filling of the respective end portion or end portions of the shed 1.

FIGS. 2 and 3 show that the length of the illustrated shed 1 suffices for the accumulation of two aligned stockpiles 27 and 27'. The stockpile 27' was accumulated prior to the stockpile 27 and is in the process of being depleted by the means 22 while the stockpile 27 remains intact or is being accumulated by the apparatus of the present invention. The strokes of the gauntry 15 and carriage 10 are preferably adjustable so that the apparatus can serve for the formation of a single stockpile extending along the full length of the shed 1 or for the formation of several stockpiles which form a single file. The distance between the portions 14a of the conveyors 14 is changed whenever the gauntry 15 reaches the one or the other end of its stroke.

It has been found that the improved method and apparatus ensure highly satisfactory intermixing of the constituents of the stockpiles 27 and 27'. In fact, the intermixing (it being assumed that each such stockpile is accumulated by resorting to two or more different types of flowable solid material) is so satisfactory that the illustrated depleting means 22 can be replaced by a conventional power-operated scoop, shovel, bucket or the like.

It is further possible to employ the improved apparatus for the accumulation of more than two stockpiles as well as for the accumulation of stockpiles consisting of different flowable solid materials. All of the stockpiles need not be of identical height and/or length. Still further, the contents of a stockpile can be changed by increasing its length, or by delivering a first type of material to form the core of a stockpile and a different second material to form a sheath or shell around the core.

The improved apparatus exhibits all important advantages but avoids the drawbacks of heretofore known apparatus. Thus, the configuration of the end portions of each stockpile (such as 27 or 27') is just as satisfactory as that of the end portions of stockpiles which are formed in accordance with the windrow method. The intermixing of two or more constituents of the stockpile 27 or 27' is just as satisfactory as, or even more satisfactory than, that in accordance with the windrow method. Still further, the division of flowable material into two continuous streams which are caused to descend at the opposite sides of the symmetry plane X—X allows for the utilization of a relatively simple and compact apparatus which occupies little room in the interior of a shed or a like structure and which is capable of thoroughly intermixing the ingredients as well as of accumulating a long, tall and wide stockpile within a surprisingly short interval of time. The operation of the apparatus can be readily programmed in such a way that the conveyors 14 or the ducts 17 deliver streams of flowable material without, or practically without, any interruptions. Since the feeding portion 8 shares the movements of the gauntry 15 lengthwise of the shed 1 and symmetry plane X—X, the conveyors 14 merely serve to advance the material sideways, i.e., at right angles to the longitudinal direction of a growing stockpile. However, it is within the purview of the invention to utilize a material diverting unit which is designed in such a way that the conveyors 14 or the equivalents of such conveyors receive material from a stationary source of supply. The illustrated apparatus is preferred at this time because it is simpler and less expensive than an apparatus wherein the conveyors 14 or their equivalents must transport the material transversely of as well as in the longitudinal direction of the growing stockpile.

A further important advantage of the improved apparatus is that many of its component parts occupy space which is invariably available in structures of the type wherein the stockpiles are formed. Thus, the interior of the upper slope 2 of a shed which resembles a mansard invariably affords space for the conveyor 7 and its feeding portion 8, carriage 10, manifold 11 and its ducts 12. Furthermore, the reinforcing structure (such as the crossheads 6) of the shed 1 can serve as a means for supporting numerous component parts of the apparatus (such as the rails 9 and the parts which move along these rails). If the stockpiles are to be accumulated outdoors, the apparatus can be mounted on a supporting structure which extends above the central longitudinal symmetry plane of the stockpile or is adjacent to one side of the area where the stockpile is to be formed.

It is further possible to omit the gauntry 15 and to mount the conveyors 14 on a second carriage (not shown) which is also movable along the crossheads 6, i.e., along the component parts of reinforcing means for the shed 1. The illustrated apparatus which employs a discrete carriage in the form of a gauntry or the like is desirable and advantageous in mansard-type sheds because the conveyors 14 can be installed at a level below the upper slope 2, i.e., in the region of the wider slope 3 so that their portions 14a can deliver streams 16 of flowable material to locations which are disposed at a substantial distance from the respective sides of the symmetry plane X—X. In other words, the illustrated apparatus can accumulate a stockpile 27 whose base is wider than the base of a stockpile which can be formed by resorting to an apparatus whose conveyors 14 or equivalent conveyors are mounted within the confines of the slope 2. Moreover, the illustrated apparatus can be installed in many existing sheds wherein the slope 2 contains a host of additional (upright and/or inclined) reinforcing elements (not shown), especially in the regions which are adjacent to the junctions 5, so that such types of sheds could not provide adequate room for the mounting of conveyors 14 at a level above the crossheads 6 except after an extensive and costly rebuilding of such sheds. The gauntry 15 can be replaced with a carriage which is arranged to travel along rails provided at the undersides of the crossheads 6. Such carriage can be suspended on trolleys which carry motors serving to advance them lengthwise of the growing stockpile, i.e., in the longitudinal direction of the ridge 2A. The interior of the slope 2 provides ample room for the conveyor 7, its feeding portion 8, manifold 11 and its ducts 12. Such room is available even if portions of the interior of the slope 2 are clogged by upright, horizontal or inclined braces which reinforce the shed 1 and are provided at both sides of the conveyor 7, as viewed in FIG. 1. The gauntry 15 is normally preferred over the just discussed suspended carriage for the conveyors 14 because the gauntry is not supported by the slopes of the shed so that the latter can be a lightweight structure which must resist only the force of the wind and the weight of snow and must only carry the parts 6 to 12. Of course, the rails 15b for the wheels 15a of the gauntry 15 take up additional floor space so that the width of the shed 1 must be increased accordingly. A suspended carriage for the conveyors 14 contributes to the weight of parts which are suspended on the components of the shed but it does not require additional floor space. If a suspended carriage is provided, the rails for its trolleys are preferably mounted on the crossheads 6, most preferably at or close to the respective junctions 5. The entire manifold 11, or at least that portion of the manifold which receives material from the feeding portion 8, preferably constitutes or resembles a box-shaped structure or is confined in a box-shaped enclosure (see FIG. 2). FIG. 1 shows that the ducts 12 of the manifold 11 slope outwardly (i.e., away from the symmetry plane X—X) and flank the conveyor 7, namely, that part of this conveyor which extends transversely of the crossheads 6 and lengthwise of the rails 9 for the carriage 10.

The conveyors 14 can be mounted for pivotal movement about axes which are adjacent to the respective sides of the plane X—X. The illustrated construction which enables the conveyors 14 to move lengthwise, i.e., at right angles to the plane X—X so as to shift their portions 14a nearer to or further away from each other without any pivotal movement of the conveyors, is preferred at the present time because it is simpler and allows the conveyors 14 to move their portions 14a to fully extended positions at a maximum distance from each other even at the two ends of the path for the gauntry 15. As mentioned above, the outlets 13 of the ducts 12 are offset with reference to each other, as considered in the longitudinal direction of the shed 1, so as to ensure that they invariably discharge material onto the upper reaches of the respective conveyors 14 (except when the conveyors 14 are moved apart on purpose so as to enable the ducts 12 to deliver streams of flowable material directly into the respective auxiliary ducts 17).

It is further clear that the conveyors 14 can be replaced by conveyors which need not pivot or move lengthwise relative to the gauntry 15 or relative to a suspended carriage but are designed to discharge streams of flowable material at numerous locations disposed at different distances from the plane X—X. For example, the conveyors 14 can be replaced by a pair of fixedly mounted belt conveyors having apertures (material discharging portions) movable along a platform which has a plurality of sealable openings located at different distances from the plane X—X. By exposing a selected opening in each of the platforms, one can select the location (distance from the plane X—X) where the conveyors of the just described design discharge streams of material which forms the piles on the floor F or on the uppermost layer of the partially grown stockpile.

Finally, it will be readily appreciated that it is not always possible to predict the cross-sectional configuration, height and/or width of the stockpile 27 or 27' with an utmost degree of accuracy. Thus, the plane X—X can be said to divide a stockpile 27 or 27' into two sections or halves which are at least substantially mirror symmetrical to one another. Furthermore, the configuration of the stockpile will deviate from a configuration with two halves which are exactly mirror symmetrical to one another if the stockpile is accumulated or formed on top of an irregular remnant of a preceding stockpile, if the number of deposited piles at one side of the plane X—X does not equal the number of piles which are deposited at the other side of such plane and/or if the rate at which the conveyor 14 at one side of the plane X—X receives flowable material does not match the rate of material delivery to the other conveyor 14.

The field of application of the present invention embraces particularly ores, coal, fertilizers and raw materials which are used in the production of cement.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of accumulating a stockpile of flowable solid material comprising the steps of:
    (a) subdividing a feed stream of said material into at least two additional streams each of which has a leader;
    (b) forming a first layer of at least substantially parallel piles of said material, the step of forming said first layer including simultaneously discharging the leaders of said additional streams along substantially parallel first paths located at opposite sides of and substantially equally spaced from a vertical symmetry plane to thus deposit a pair of first elongated piles of said material, and the step of forming said first layer further including changing the distance between said leaders at most by the combined width of said first piles, and thereafter simultaneously discharging said leaders along second paths which are substantially equally spaced from said symmetry plane on opposite sides of the latter and are substantially parallel to said first paths, each of said second paths being disposed adjacent to one of said first paths so that a second elongated pile of said material is deposited next to each of said first piles, and said first and second piles being deposited consecutively; and
    (c) completing said stockpile, the completing step including depositing at least one additional layer of substantially parallel piles of said material on said first layer, and the deposition of said at least one additional layer when the latter has at least four piles being performed using the forming step, the deposition of said at least one additional layer when the latter has two or three piles including simultaneously discharging said leaders along substantially parallel paths located at opposite sides of and substantially equally spaced from said symmetry plane, and the forming and completing steps being performed in such a manner that symmetry about said plane is substantially maintained at all times.

2. The method of claim 1, further comprising the step of depleting the stockpile, including removing rows of flowable material substantially at right angles to said symmetry plane.

3. The method of claim 1, wherein the completing step is performed in such a manner that each pile of said at least one additional layer partially overlies and is staggered with reference to a pile of said first layer.

4. The method of claim 1, wherein the forming and completing steps are performed in such a manner that said stockpile has a substantially triangular cross-sectional outline upon completion thereof.

5. Apparatus for depositing flowable solid material to form a stockpile which is substantially symmetrical about a vertical symmetry plane, said apparatus comprising:
   (a) a source of supply of the flowable material;
   (b) means for simultaneously diverting first and second streams of the flowable material from said source, said diverting means including a manifold having first and second outlets for the flowable material, and first and second conveyors which extend substantially transversely of said symmetry plane and receive the flowable material from the respective outlets, and said conveyors having respective first and second material discharging portions for the flowable material, said material discharging portions being located at opposite sides of, and being substantially equally spaced from, said symmetry plane;
   (c) means for moving said diverting means, said moving means including means for translating said material discharging poritons back-and-forth in at least substantial parallelism to said symmetry plane;
   (d) means for shifting said material discharging portions transversely of said symmetry plane between respective first positions in which the distance between said material discharging portions is less than one-half the width of the stockpile, and respective second positions in which said distance exceeds one-half the width of the stockpile, said shifting means including means for displacing said conveyors relative to each other and with reference to said manifold so as to advance said material discharging portions nearer to or further away from one another; and
   (e) duct means disposed below and aligned with said outlets, said conveyors being shiftable to and from positions in which said outlets can discharge flowable material directly into said duct means.

6. The apparatus of claim 5, wherein said duct means comprises discrete first and second auxiliary ducts which are in register with the respective outlets.

* * * * *